Sept. 27, 1932.  J. SINGERMAN  1,880,026
COLOR BOX
Filed Jan. 2, 1931   2 Sheets-Sheet 1

INVENTOR
JOSEPH SINGERMAN
BY
ATTORNEY

Sept. 27, 1932.   J. SINGERMAN   1,880,026
COLOR BOX
Filed Jan. 2, 1931   2 Sheets-Sheet 2

INVENTOR
JOSEPH SINGERMAN
BY
ATTORNEY

Patented Sept. 27, 1932

1,880,026

UNITED STATES PATENT OFFICE

JOSEPH SINGERMAN, OF NEW YORK, N. Y.

COLOR BOX

Application filed January 2, 1931. Serial No. 506,123.

The invention relates to a color box for use as an apparatus in schools and colleges to demonstrate various color phenomena, such as color formation, color effects, color fatigue, etc. My novel color box has a particular application in its use to demonstrate these phenomena, for instance, to a class in physics or psychology, the object of the invention being an apparatus and a method for illustrating the formation of a spot or spots of varied color composition, whereby several spots of colored light, partially overlapping, are used to demonstrate the effects of mixing colors of different hues. My novel color box is a self-contained apparatus requiring no additional parts and accessories in its use as a device for demonstrating the various principles underlying color formation.

Among the objects of my invention are a simple and compact apparatus and the method of using such apparatus to demonstrate, among other phenomena, primary and secondary colors, false primary colors, complementary hues, contrasting color effects, color fatigue, and selective color reflection. The methods used to demonstrate these various phenomena with the use of my novel apparatus will be fully explained hereinafter.

A further object of my invention is to provide an apparatus which may be used as an advertising or display device in which certain color effects are utilized in the formation of the advertising legend or legends. A still further object of my invention is to provide an even more compact form of apparatus than is contemplated by my broad idea for illustrating the various phenomena of color combinations by means of a smaller color box in which, however, the principles underlying my main color box construction and method for using the same, are employed.

In its broadest aspect the invention contemplates the demonstration to a class or audience of the effect of mixing various colored lights by the use of the principle of multiple shadows produced by separate lights. My apparatus is so proportioned and so designed that the spots of light emitted from the light sources contained therein partially overlap upon a translucent screen after the beams of light have been permitted to pass through an aperture in an opaque screen interposed between a set of separate colored lights and the translucent screen.

My new and novel color box involves the use of a pattern well known to the prior art and which has been used for many years to explain and to demonstrate color combinations. This pattern is the one in which three colored spots are made to appear simultaneously on a disc so that they overlap. If the three colors selected for demonstration are the primary colors red, green and blue, the pattern on the disc will shown at a glance all three of these primary colors as well as the secondary colors formed by the combination of two or more primary colors wherever such primary colors overlap. Thus where blue and green intermix the secondary hue will be blue-green; where red and blue intermix the secondary color will be purple; where red and green intermix, the secondary color will be yellow; and where all three primary colors, i. e. red, green and blue, intermix, a white field will be observed.

A number of devices for teaching color combinations are known to the prior art. Marked disadvantages accompany the use of such devices, among which may be mentioned the following: the number of lights and the relative intensity of each light cannot be varied at will; the mixture of lights produced is not a true physical mixture of colors but rather an optical illusion which complexity must be explained to the class or audience; the colors which appear on the pattern are not really the colors that mix for which reason the class never sees the exact components which enter into the mixture; the colors produced are of a low degree of intensity, for example, instead of white when all primary colors are mixed, only gray is produced; and, a majority of the devices are not adapted to experiments in color fatigue.

In the accompanying drawings in which examples of my invention are illustrated, the embodiment of the color box of my invention being merely a preferred form:

Fig. 6 shows a mask bearing an advertising figure. Such mask is intended merely to illustrate the type of such device which may be used in connection with my apparatus, the adaptability of my color box with various types of advertising signs being hereinafter more fully referred to.

Figure 1:
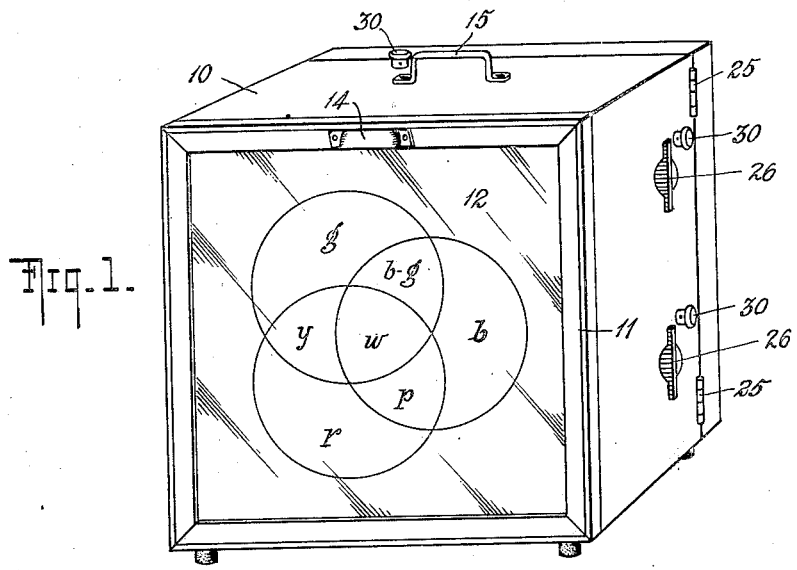
Fig. 1 is a perspective view of a color box constructed in accordance with my invention for use in a classroom and which may be adapted by a simple change hereinafter to be referred to, to serve as a display or advertising apparatus.

Referring more particularly to the drawings, in which similar reference characters identify similar parts in the several views, 10 is a box of wood or similar suitable material, the front or observation side of which comprises a removable frame 11 in which is set a white translucent glass known as "milk" or opal glass 12. The frame is secured to the sides of the box by means of a ball and spring joint 13 and the hooked rail 13' adapted to engage the ledge 14'. A handle 14 provided on the frame makes possible the removal of such frame from the box by the simple operation of pulling thereon to disengage the ball of the joint from the wooden sides of the box. The box is provided at its top with a carrying handle 15. In the rear portion of the color box are suitably mounted at points approximating the apices of an equilateral triangle, three electric light bulbs 16, 17 and 18. Each of said lamps has its socket 19 supported by a threaded pipe 20 secured by nuts 23 and 24 to a bracket 22 secured by nut 21 to the back of the box. For adjustment of the lamps the brackets 22 may be rotated in a vertical plane after loosening the nut 21. Each of the lamps may be adjusted longitudinally by means of the two lock nuts 23 and 24. Adjustment of the lamps is ordinarily necessarily made only once when a new lamp is inserted. The rear panel of the box is hinged as at 25, 25 so that it may be swung open to provide access to the interior of the box.

Figure 4:
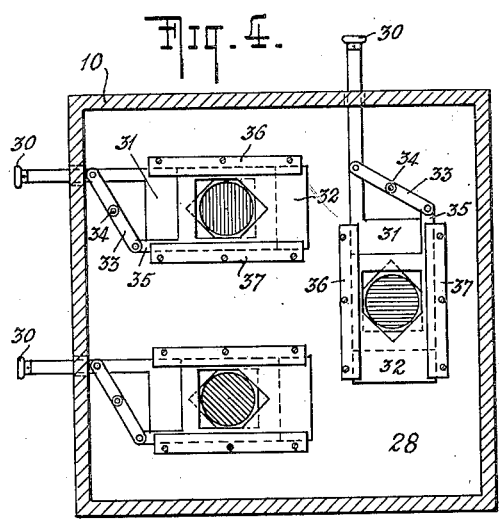
Fig. 4 is a section along the line 4—4 of Fig. 2.
Figure 5:
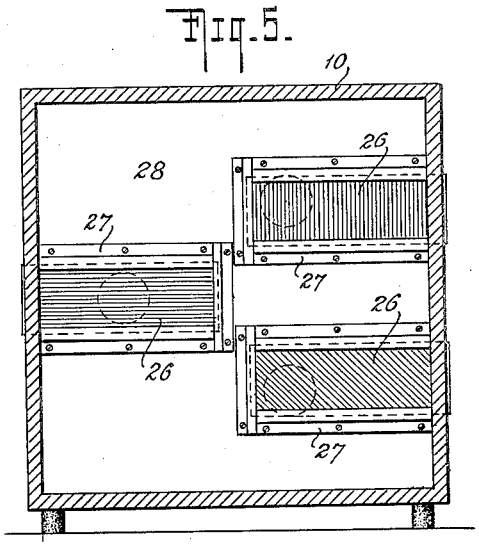
Fig. 5 is a section along the line 5—5 of Fig. 2.

In front of each bulb 16, 17 and 18 is a color filter 26 of rectangular configuration, each representing one of the primary colors red, blue and green. These color filters are removably mounted within rectangular guide frames 27 mounted upon an opaque screen or mask 28 in alignment with apertures therein, such mask being positioned somewhat in front of the electric light bulbs. On such mask, coincident with the frames 27 and between the color filters and the lamps are shutters 29 by means of which the intensity of each light may be varied from zero to its maximum. The manipulation of each of the three shutters, illustrated in detail in Figs. 4 and 5, is accomplished by moving the handles 30 inwardly or outwardly from the sides of the box. Each of the shutters 29 comprises a pair of metal plates 31, 32, having an elongated pentagonal aperture cut therein, the apices of the apertures of the plates being oppositely disposed so that as the two plates are drawn toward each other, the area of the rectangular opening formed by the apertures of the plates is decreased, while, when the two plates are drawn apart, such opening is enlarged. Each of the handles 30 comprises an extended projection of one plate (31) and has connected thereto one end of a lever 33 pivoted at 34, the other end of said lever being connected to an extended projection 35 of the second plate (32). The plates 31 and 32 slide in the brackets 36, 37 of the shutter mechanism (see Fig. 4). Thus, when the handles 30 are pushed inwardly into the box the two component plates of each shutter mechanism are drawn towards each other, thus diminishing the size of the opening formed by the triangular portions of the pentagonal cuts in such shutter plates, and when such handles are drawn outwardly, such openings are enlarged. The handles, and therefore the shutters, controlled thereby, are capable of independent manipulation.

Figure 2:
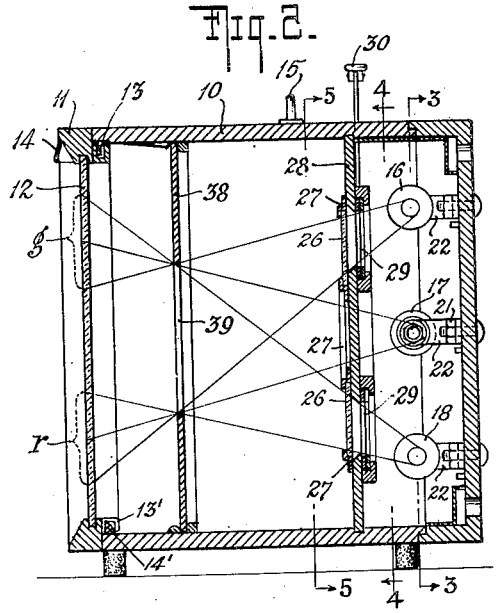
Fig. 2 is a transverse vertical section through the color box illustrated in Fig. 1.
Figure 3:
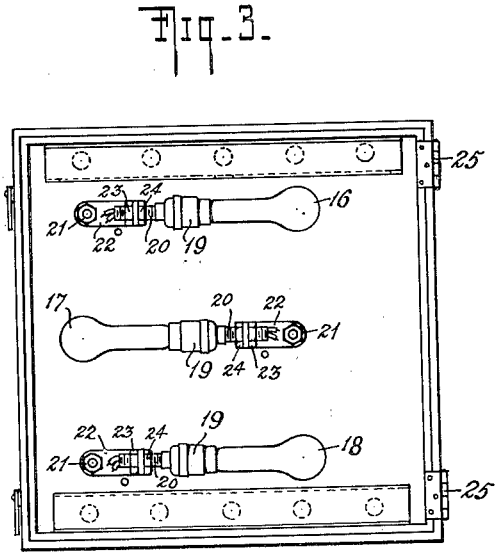
Fig. 3 is a section along the line 3—3 of Fig. 2.

Interposed between the mask or screen carrying the color filters and the screen 12 of translucent glass is an opaque partition 38 having a large aperture 39 cut through its center. The outlines of the beams of light emitted from the lamps, after having passed through the filters are defined by the oblique lines passing through the aperture 39. It will be evident from an examination of Fig. 2 that the translucent screen 12 receives an admixture of various colored lights projected thereon from the lamps through the aperture 39, the various colors as viewed through such translucent screen being identified in Fig. 1 by the initials of the primary colors, $g$ for green, $b$ for blue, $r$ for red, and by the letters $p$, for purple, where a mixture of blue and red is projected, $y$ for a mixture of green and red, $b$-$g$ for a mixture of blue and green, and $w$ for white where all of the primary colors are combined. The appearance of these colors and the mixtures thereof are shown clearly in the color pattern formed on the screen 12 as viewed from the front of the box (see Fig. 1).

While I have described the construction of my novel color box with three lamps with a color filter for each of said lamps, it is obvious that the principles of my invention are equally applicable to a box utilizing only two lamps or even one lamp. Obviously a greater number of lamps than three may be used, in which case a separate filter for each lamp may be provided.

To demonstrate the various phenomena hereinabove referred to, the following instructions may be briefly referred to:

1. To demonstrate primaries and secondaries, insert the primary filters, red, green and blue, and flash two or three of the lights at a time on the screen.

2. To demonstrate false primaries, insert the false primary filters blue-green, yellow and purple, and proceed as above.

3. To demonstrate complementary hues proceed as in 1 or in 2, explaining the nature of complementary colors as being opposite to each other in the pattern flashed on the screen.

4. To demonstrate contrasting effects, flash one color on the screen and explain the appearance of the complementary hue by the appearance of the gray background as contrast.

5. To demonstrate color fatigue, flash one color on the screen and instruct the members of the audience to stare at the spot for approximately half a minute and then turn off the light. The observer still staring at the screen will see the complementary color appear in place of the original color.

6. To demonstrate selective reflection the color box is to be placed with its side or its back facing the class. Remove both the front screen and the intermediate screen (44). Using one colored light at a time observe samples of cloth or different color.

Figure 6:
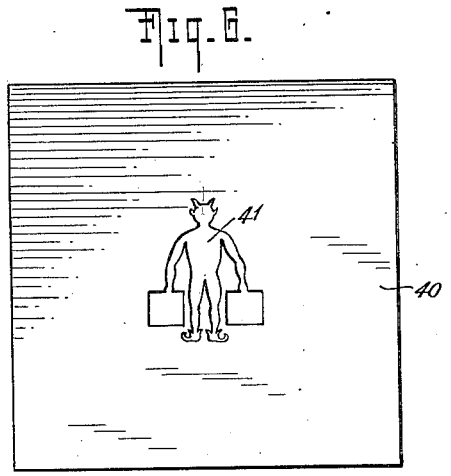

In Fig. 6, I have illustrated one type of mask 40 bearing a cut-out advertising figure 41 which may be placed within the color box in place of the opaque partition 38. Such mask may obviously carry any desired legend, figure, etc., such legend, figure, etc. being projected onto the translucent screen 12 when the beams of light pass therethrough. The figure on such mask is preferably so proportioned that a definite portion of the images formed on the screen will overlap thereon producing the effective color combinations hereinabove referred to in connection with the formation of the pattern of Fig. 1. I have found that a novel advertising effect may be obtained by the provision on the rear face of the translucent screen 12 of advertising legends in the form of figures or printing. These legends, or suitable portions thereof, may be in such colors as would, because of their selective absorption property, result in the appearance and disappearance of portions thereof when light beams of different colors are projected thereon.

While I have described a particular embodiment of my invention, it is obvious that various modifications therein, particularly in the arrangement of the parts, may be made without departing from the spirit of the invention.

I claim:

1. In a color box the combination of a screen of translucent material, an apertured opaque screen, a plurality of color filters mounted on said opaque screen contiguous with the apertures therein, and an opaque partition having a central aperture interposed between said filters and said translucent screen.

2. A device of the kind described comprising a box, sources of light suitably mounted on the inner surface of the rear panel of said box, an apertured opaque screen positioned in front of said light sources, a plurality of color filters removably mounted on said opaque screen, a screen of translucent material forming the front face of said box, and an opaque partition having a central aperture interposed between said opaque screen and said translucent screen.

3. A device of the kind described comprising a box, a plurality of sources of light suitably mounted within said box, an apertured opaque screen positioned in front of said light sources, a screen of translucent material forming the front face of said box, and an opaque partition having a central aperture interposed between said opaque screen and said translucent screen.

4. A device of the kind described comprising a box, a plurality of sources of light suitably mounted within said box, an apertured opaque screen, positioned in front of said light sources, separate color filters for each of said sources of light mounted on said opaque screen, a screen of translucent material forming the front face of said box, and an opaque partition having a central aperture interposed between said sources of light and said screen.

5. A device of the kind described comprising a box, a plurality of sources of varied colored light suitably mounted within said box, an apertured opaque screen positioned in front of said light sources, a screen of translucent material forming the front face of said box, and an opaque partition having a central aperture interposed between said sources of light and said screen.

6. A device of the kind described comprising a box, a plurality of sources of light suitably mounted on the inner surface of the rear panel of said box, an apertured opaque screen positioned in front of said light sources, separate color filters representing primary colors, one for each of said sources of light, a screen of translucent material forming the front face of said box, and an opaque partition having a central aperture interposed between said sources of light and said screen.

7. A device of the kind described comprising a box, a plurality of sources of light adjustably mounted on the inner surface of the rear panel of said box, an apertured opaque screen positioned in front of said light sources, and an opaque partition having a central aperture positioned in front of said screen.

8. A device of the kind described comprising a box, a plurality of sources of light suitably mounted on the inner surface of the rear panel of said box, an apertured opaque screen positioned in front of said light sources, a screen of translucent material forming the front face of said box and removably secured therein, and an opaque partition having a central aperture interposed between said sources of light and said screen.

9. A device of the kind described comprising a box, a plurality of sources of light suitably mounted within said box, separate color filters for each of said sources of light, adjustable shutters interposed between said filters and said sources of light, a screen of translucent material forming the front face of said box, and an opaque partition having a central aperture interposed between said sources of light and said screen.

10. In a device of the kind described the combination of a box, an apertured opaque screen, positioned in front of said light sources, a plurality of sources of light suitably mounted within said box, a screen of translucent material forming the front of said box, and an opaque partition interposed between said sources of light and said screen, having an advertising legend thereon.

JOSEPH SINGERMAN.